United States Patent Office 2,981,642
Patented Apr. 25, 1961

2,981,642
METHODS OF REMOVING A DRIED SILVER AND PHENOL-FORMALDEHYDE RESIN PAINT FROM AN ARTICLE

John Danaczko, Jr., Oak Park, Ill., assignor to Western Electric Company, Incorporated, New York, N.Y., a corporation of New York No Drawing. Filed Dec. 7, 1959, Ser. No. 857,511

3 Claims. (Cl. 134—2)

The present invention relates generally to methods of removing a dried silver and phenol-formaldehyde resin paint from an article having an inert surface, and more particularly to methods of removing such paint from the ends of deposited carbon resistors.

Accordingly, the general object of the invention is to provide new and improved methods of removing a dried silver and phenol-formaldehyde resin paint from an article having an inert surface.

In the manufacture of deposited carbon resistors, a coating of carbon having a controlled thickness is deposited on the surface of a cylindrical ceramic core by the decomposition of methane gas. A silver paint having a nonvolatile content consisting of about 80 to 92% by weight flake silver with the balance being a phenol-formaldehyde resin is then applied to the ends of the deposited carbon resistor and baked thereon to permit electrical connection. The resistance of the unit will be determined by the thickness of the carbon deposit and the distance between the silvered ends. In the practice of this process, it sometimes happens that either the silver or the carbon coating is not perfect, and the resistors do not meet manufacturing standards. Since the ceramic cores are relatively expensive, and since the carbon deposition step is expensive and time-consuming, it is highly desirable to remove the baked silver-resin paint and reuse the cores.

Accordingly, another object of the invention is to provide a method of completely removing a dried paint consisting of silver and a phenol-formaldehyde resin from the ends of deposited carbon resistors so as to enable reuse of the cores.

With the foregoing and other objects in view, an illustrative method of removing a dried paint consisting of a major proportion of metallic silver and a minor proportion of a phenol-formaldehyde resin from an article having an inert surface may include the step of immersing the article in an aqueous solution of ammonium hydroxide and hydrogen peroxide until the silver has been dissolved and the resin has become suspended in the solution. Preferably, the solution consists of 20 to 30% by weight of ammonium hydroxide and 2.5 to 5% by weight of hydrogen peroxide.

Other objects, advantages and features of the invention will be apparent from the following detailed description of a specific example thereof.

*Example*

A solvent solution was prepared by mixing equal parts by volume of a 10% by weight solution of hydrogen peroxide and a 56% by weight solution of ammonium hydroxide. This solution contains approximately 5% by weight hydrogen peroxide and approximately 28% by weight ammonium hydroxide, a mol ratio of about 5.8 to 1.

A number of defective deposited carbon resistors bearing a baked paint consisting of approximately 85% flake silver and 15% of a phenol-formaldehyde resin binder were placed into a glass container. The reagent described above was then added in an amount sufficient to cover the resistors completely. A vigorous reaction proceeded with the silver being dissolved out by the reagent and going into solution as $Ag(NH_3)_2^+$ complex ion. While the resin is not itself dissolved by the reagent, the leaching out of the silver by the reagent and the vigor of the reaction are sufficient to separate and remove substantially all of the resin from the core. The resin becomes suspended in the solution in the form of very fine particles.

After about 30 minutes, the cores were removed from the solution, were washed with water to remove excess reagent, and then dried in an oven at approximately 110 to 120° C. Examination of the treated cores showed them to have been substantially cleaned of the silver and resin so as to present a clean carbon surface. These cleaned cores may then be reprocessed. If it is also needed to remove the carbon coating, this may be done by heating in an oxygen atmosphere. The foregoing process is particularly useful in the removal of a silver-resin paint as described because treatment with various other solvents for silver, particularly acids, has not been found effective to accomplish complete removal of the resin.

While lower and higher concentrations of the reactants may be used, best results are obtained by using a rather concentrated solution containing at least 4 mols of ammonium hydroxide for each mol of hydrogen peroxide, since the reaction requires a ratio of 4 mols to 1. The overall reaction is believed to proceed as follows:

$$4NH_4OH + H_2O_2 + 2Ag \rightarrow 2Ag(NH_3)_2^+ + 2OH^- + 4H_2O$$

It is preferred to utilize an excess of ammonium hydroxide since, during the reaction, some ammonia gas is lost to the atmosphere. A range of about 2.5 to 5% by weight of hydrogen peroxide and about 20 to 30% by weight of ammonium hydroxide has been found to yield best results.

If desired, the solution may be heated gently, particularly after the initial vigorous reaction, to speed up the dissolving process. The time required to clean the resistors depends on the thickness of the paint, the strength of the reagent, and whether or not the solution is heated; however, in most cases the resistors are clean after about 30 minutes.

By the phrase "an article having an inert surface" is meant an article having a surface which is inert or nonreactive with respect to the reagent used, such as the carbon surface of a deposited carbon resistor.

While various specific embodiments and examples of the invention have been described in detail hereinabove, it should be realized that various modifications may be made by those skilled in the art without departing from the spirit and scope of the invention.

What is claimed is:

1. The method of removing a dried paint consisting of a major proportion of metallic silver and a minor proportion of a phenol-formaldehyde resin from an article having an inert surface, which comprises the step of immersing the article in an aqueous solution of ammonium hydroxide and hydrogen peroxide until the silver has been dissolved and the resin has become suspended in the solution.

2. The method of removing a dried paint consisting of about 80 to 92% by weight metallic silver and about 20 to 8% by weight of a phenol-formaldehyde resin from the ends of deposited carbon resistors, which comprises the step of immersing the resistors in an aqueous solution of ammonium hydroxide between 20 and 30% by weight and hydrogen peroxide between 2.5 and 5% by weight until the silver has been dissolved and the resin has become suspended in the solution.

3. The method in accordance with claim 1, wherein the mol ratio of ammonium hydroxide to hydrogen peroxide is at least 4 to 1.

References Cited in the file of this patent

UNITED STATES PATENTS

| 608,948 | Barnard | Aug. 9, 1898 |
| 2,567,835 | Alquist | Sept. 11, 1951 |

OTHER REFERENCES

Mellor: "Comprehensive Treatise on Inorganic and Theoretical Chemistry" (1923), vol. 3, pages 345 and 351, Longmans, Green & Co., New York.